United States Patent Office 3,411,634
Patented Nov. 19, 1968

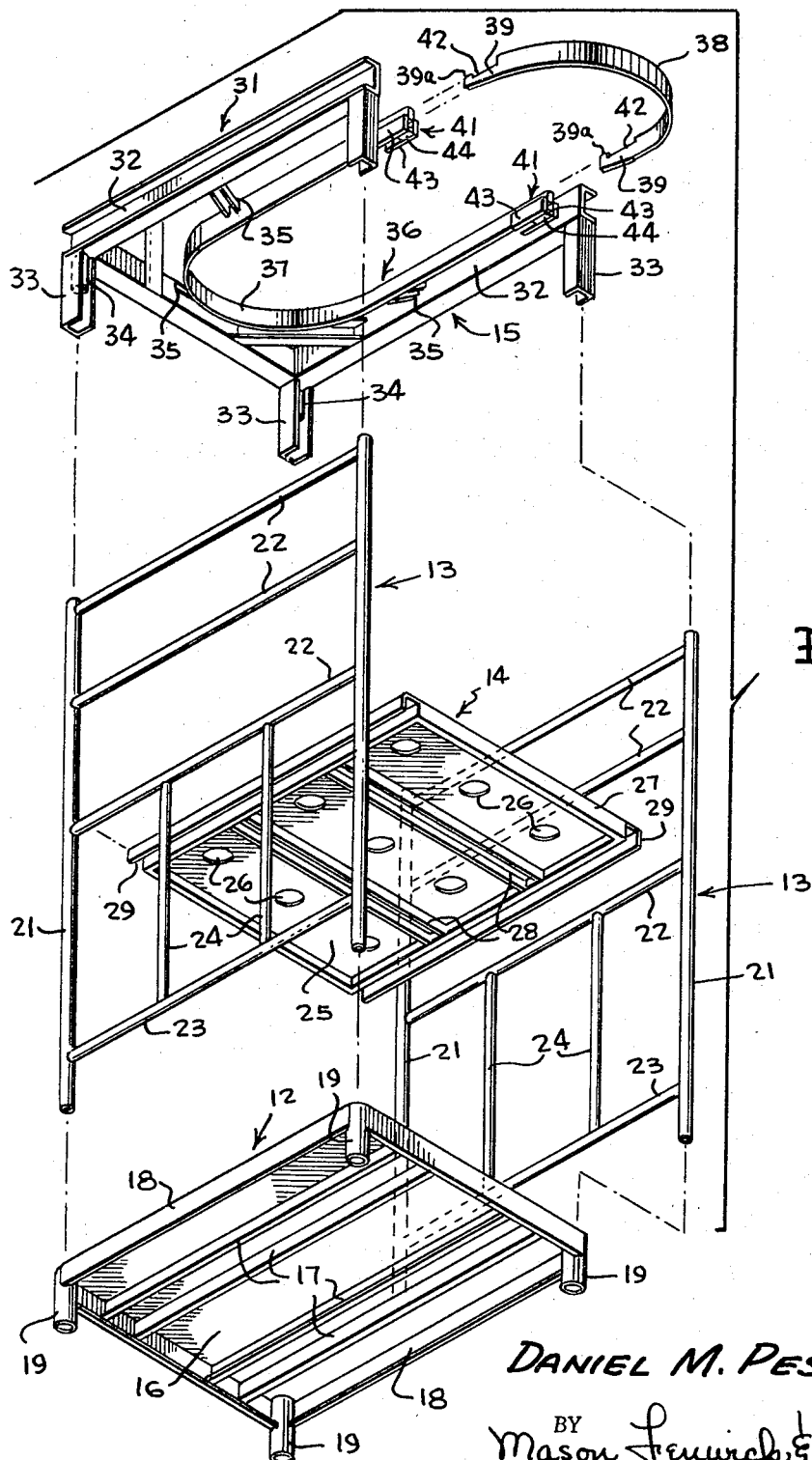

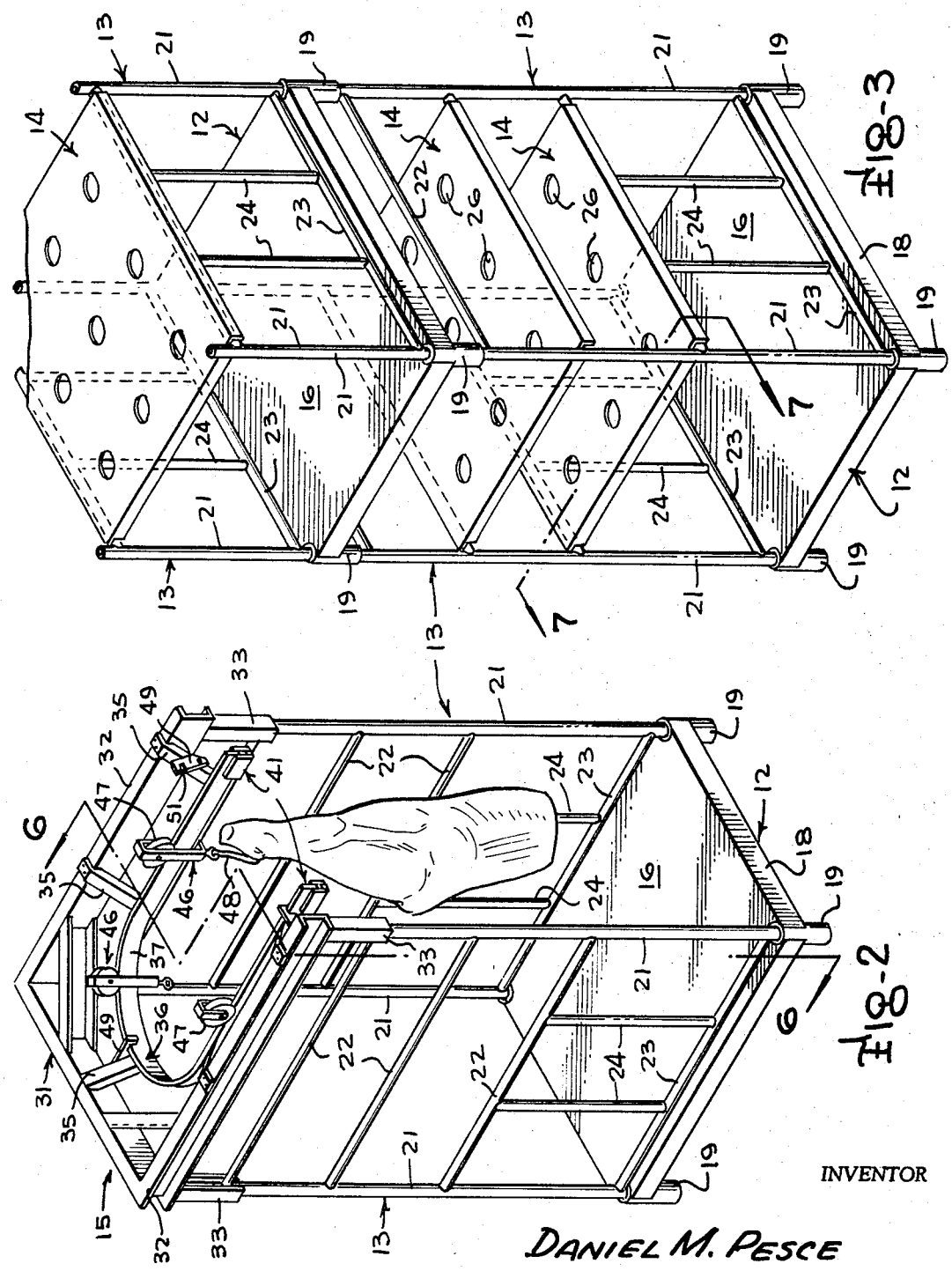

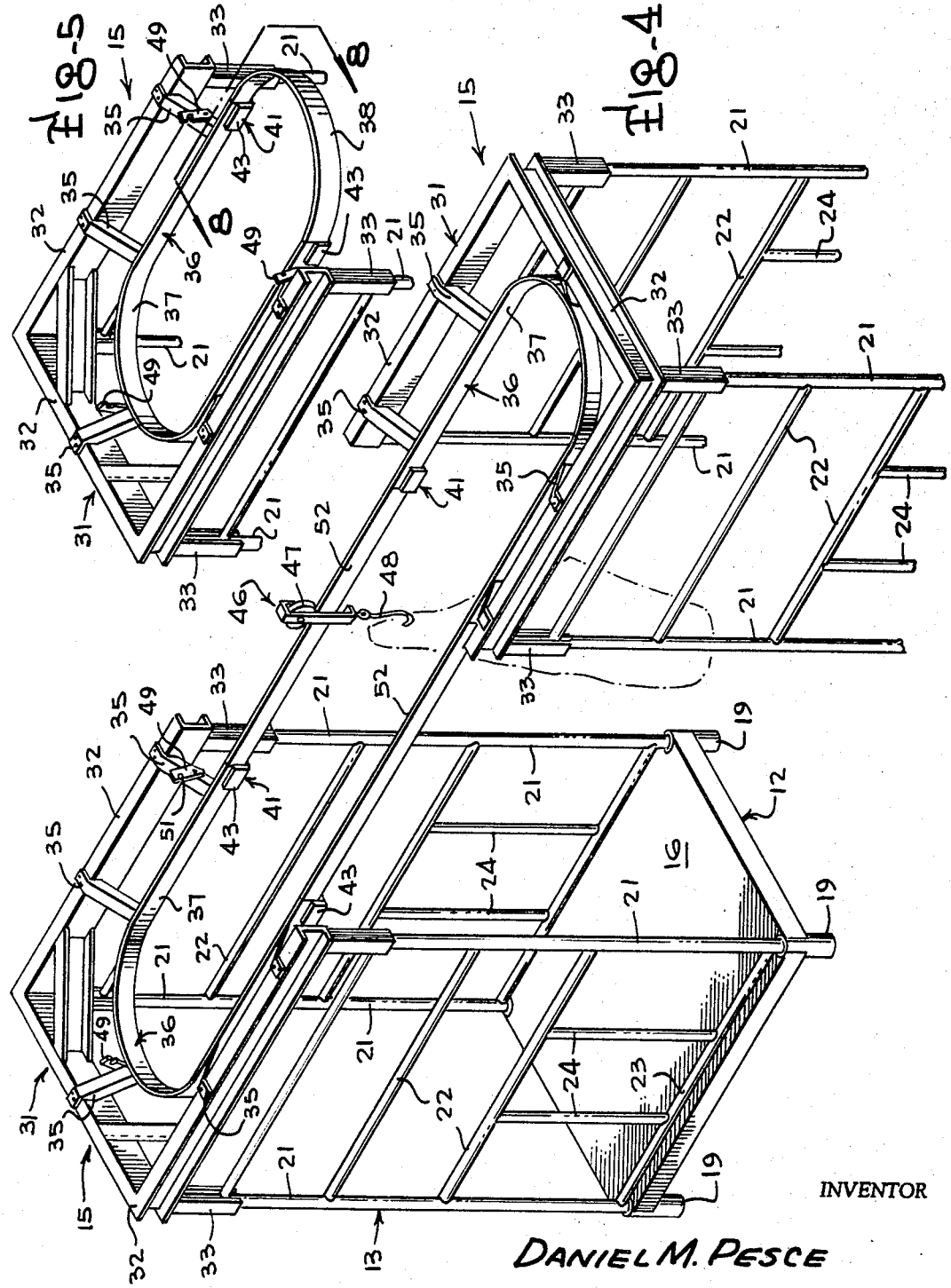

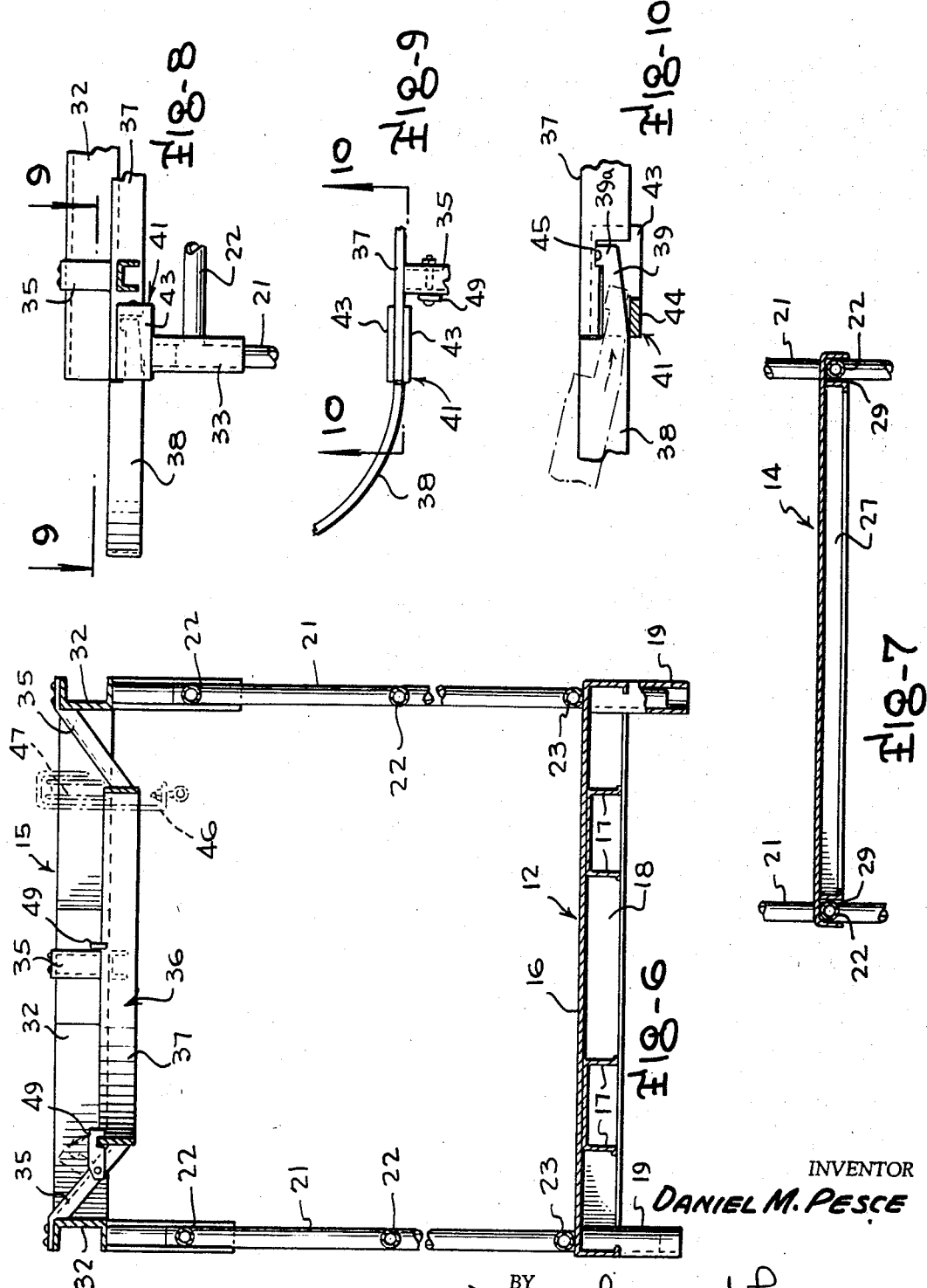

3,411,634
MEAT HANDLING APPARATUS
Daniel M. Pesce, 9731 SW. 157th Terrace,
Miami, Fla. 33157
Filed Nov. 29, 1966, Ser. No. 597,732
8 Claims. (Cl. 211—162)

ABSTRACT OF THE DISCLOSURE

A stackable meat hanging and supporting structure in which a lower base member is provided with vertical standards supporting horizontal removable shelves with the upper ends of the vertical standards being formed so that either track means supporting roller supporting meat hanger means or another base member of an upper identical apparatus are attachable with the track means being U-shaped and with straight track portions being provided to enable connection between two of the U-shaped tracks of two different structures in facing relationship to provide a composite construction of enhanced storage capability.

---

This invention relates in general to storage devices, and more particularly to meat handling apparatus for storing, handling and shipment of bulk-type meats.

At the present time, bulk-type meats are handled repeatedly from the slaughter house to the local butcher shops. There has not been devised a reasonable method by which bulk-type meats may be shipped between the slaughter house and the local butcher in which many physical handlings of the meat are eliminated. In general, bulk meats are shipped upon hanging meat rails in transport trailers or railroad cars equipped for that purpose. However, once the meat arrives at its destination, it must be physically removed from the meat rail and transported by human effort to the next storage place. Such repeated handling tends to destroy the quality of the meat and, in addition, the meat is normally quite heavy and it is not unknown that the persons physically handling the meat to incur injuries upon the job. In addition, once the meat has been hanging either in the transport vehicle, or in the butcher shop, there are considerable drippings of animal fats and blood which must be disposed of. It is the normal method to apply sawdust to the floor of the shipping vehicle or the butcher shop which, when compacted with the drippings, is subsequently removed and replaced with new sawdust. However, it is well known that the sawdust compacted with animal fats presents a fire hazard and also enhances the propagation of bacteria.

Summary of the invention

The above-listed deficiencies of the previously employed methods of devices are overcome by the instant invention through the provision of meat supporting units comprising a lower base member which has openings to matingly receive the ends of vertical corner members which are connected by horizontal members to provide sides for the device. Horizontal shelves can be supported by the horizontal connecting members in a removable manner and are provided with openings through which drippings can progressively fall for eventual impingement upon the base member which is of flat planar construction. A rail supporting member supporting a U-shaped track means upon which roller supported hangers or hooks are provided can be mounted on the top of each of the vertical corner members. However, if it should be desired to stack the structures for additional storage space, another base member of an identical unit can be supported on top of the vertical members in place of the track supporting member. Another feature of the invention resides in the provision of straight track means which can be connected between two of the units when the units are in facing relationship with the open end of the U-shaped track members facing each other so as to connect the open ends to provide an oval shaped composite track having great storage capacity.

Therefore, the invention provides a uniquely versatile meat storing and hanging unit which can employ shelving in combination with bulk hangers and which can be stacked in vertical array to save space in a storage room if desired. Moreover, the invention prevents the dripping of blood and grease from the meat onto the floor and obviates the need for sawdust. Also, the construction completely eliminates most of the manual handling of meat previously required.

Therefore, an object of this invention is the provision of a meat handling apparatus which provides a reliable and easy to use device for handling bulk-type meats.

Another object of this invention is to facilitate the handling, storage and shipment of meats and bulk products without the continual human physical handling, thereby reducing labor costs.

Another object of this invention is the provision of a meat handling apparatus which is a self-contained bulk meat shipping and storage device and which may be utilized by the butcher when he is reducing the bulk-type meats into saleable packages.

Still another object of the invention is the provision of a meat handling apparatus which reduces the cost of transportation of bulk-type meats by the elimination of costly transportation trailers and other vehicles especially designed for this sole function.

Another object of the invention is the provision of a meat handling apparatus of simple construction allowing easy assembly and disassembly of the component parts for storage and cleaning.

Still another object of the invention is the provision of a device having racks for holding meats and other articles or substances which are liable either from their nature or consistency to exude or drip liquids, and which device shall dispose of the dripping liquids which otherwise would fall upon the floor or upon other objects in the rack.

Yet another object of the invention is the provision of a meat handling apparatus that is of unitized construction and may be used in modular units.

A still further object of the invention is the provision of a device for handling bulk-type meats and other similar articles, which is of inexpensive construction and made of easily secured materials and which provides flexibility of operation and may be easily handled in the intended manner.

Other objects, advantages and capabilities of the invention will become apparent from the following description, taken in conjunction with the accompanying drawings showing only a preferred embodiment of the invention.

In the drawings:

FIGURE 1 is an exploded perspective view of the meat handling apparatus of the present invention;

FIGURE 2 is a perspective view of the present invention showing a bulk-type meat being hung in the intended manner;

FIGURE 3 is a perspective view showing the framework of the present invention being utilized with storage shelves and disclosing the invention having a suitable configuration for vertical stacking;

FIGURE 4 is a perspective view of the invention being utilized in pairs of units and with the track feature of the invention of such configuration that the bulk-type meats may be moved from one of the handling apparatus units to the adjacent unit without physical intermediate handling;

FIGURE 5 shows a perspective view of the top track member of the present invention being utilized with the closed removable track portion which allows the bulk meats to be readily moved about within the handling apparatus;

FIGURE 6 is a vertical section view taken along lines 6—6 of FIGURE 2;

FIGURE 7 is a vertical section view taken along lines 7—7 of FIGURE 3;

FIGURE 8 is a vertical view taken along lines 8—8 of FIGURE 5;

FIGURE 9 is a horizontal section view taken along lines 9—9 of FIGURE 8; and

FIGURE 10 is a vertical section view taken along lines 10—10 of FIGURE 9 indicating in broken lines the proper manner in which the removable track section is joined to the fixed track section of the meat handling apparatus.

Referring to the drawings wherein like reference characters designate corresponding parts throughout the several figures, and specifically to FIGURE 1, the meat handling apparatus of the present invention is disclosed generally by the numeral 11. Comprising the meat handling apparatus 11 is a dismantleable structure which includes a base member 12, a pair of upstanding vertically disposed side racks 13 which interfit with the base member 12 in a manner to be later described. Alternatively used with the apparatus of the present invention is a removable storage tray 14 which is suitably suspended between the vertically disposed side racks 13, or there may be placed uppermost upon the side racks 13, a top track support member 15.

The base member 12 may be constructed of heavy gauge aluminum, or may even be of cast aluminum so as to provide a rigid support for the remaining portions of the structure. A planar surface 16 provides a drip pan to catch the dripping of fluids from any hanging bulk meat which will be stored from the track support member 15. Underneath the planar surface 16 are a plurality of bracing supports 17 which provide additional stability to the base member. Depending from the peripheral extent of the planar surface 16 is a peripheral flange 18 which has at the four corners of the base member 12 a tubular foot member 19. It is upon the tubular feet 19 that the base member and, in fact the entire meat handling apparatus, is adapted to rest.

Each of the side racks 13 are of identical construction and comprise a pair of vertical standards 21 of tubular construction which are interconnected by a plurality of upper horizontal braces 22 and one lower horizontal brace 23. To provide additional rigidity to the side racks there is positioned between the lowermost upper horizontal brace and the lower horizontal brace 23 a plurality of vertically disposed braces 24. For simplicity of construction and for general economy it is anticipated that the entire side racks 13 will be constructed of tubular materials which are readily available commercially. However, it is within the scope of this invention that the particular parts described herein may be made in other configurations and of any suitable material that will accomplish the objects of the invention.

When assembling the meat handling apparatus of the present invention the side racks 13 are positioned so that the lowermost end of the vertical standards 21 fit into the tubular feet 19 of the base member. Therefore, it is readily apparent that the lower end of the vertical standards 21 and, in fact the entire standard itself, must have a smaller outer diameter than the inner diameter of the tubular feet 19. However, it is desired that the standard 21 fit within the feet 19 in a snug manner so that there is little or no room for excessive play between the two portions of the apparatus.

At times if it should be desired not to hang large bulk pieces of meat from the top track support member 15, the removable tray 14 may be positioned upon and supported between the side racks 13. Depending upon the need, one or more of the removable trays 14 may be utilized. These trays comprise a flat planar surface 25 having a plurality of circular openings 26 which allow free circulation of air among products which will be stored upon the trays 14. These trays, much like the base member 12, have a peripheral downwardly extending flange 27 and additional cross bracing 28 which extends across the bottom-most surface of the planar member 25. On two opposing sides of the tray 14 are support channels 29 which provide the means for affixing the trays upon the upper horizontal braces 22.

Should it be desired to hang bulk meats in the meat handling apparatus 11, then the top track support member 15 is so constructed that it rests upon the uppermost portion of the vertical standards 21. Comprising the top track support member 15 is a channel beam frame 31 having an overall rectangular configuration with one open end. Frame 31 is constructed of channel beams 32 having their open side facing outwardly. Depending from the four corners of the channel beam frame 31 are channel shaped support members 33 which operatively engage the vertical standards 21 so that the top track support member 15 will not be disengaged from its rest position. Included within the supports 33 and also affixed at the corners of the channel beam frame 31 is a leg 34 which rests precisely upon the top-most surface of the vertical standards 21 and which provides the full support of the top track support member 15. It should be noted that the supports 33 actually encompass and fit around the vertical standards 21 while the legs 34 fit atop the standards.

Supported within the interior confines of the channel beam frame 31 by suitable track supports 35 is an oval track 36. The track 36 generally defines two portions, one being a U shaped portion 37 which is fixed and stationery and which provides the general track for movement of the bulk meat when in a hanging position. However, so that the meat may be easily moved within the meat handling apparatus 11, there is provided a removable curved track portion 38. The curved track 38 has the same radius of curvature as the curved portion of track 37, except that in the extreme ends there is an interlock tongue 39 which operatively engages a track connector 41 affixed to the free ends of the U shaped track 37. The interlock tongues 39 have a cutout 42 which, in part, helps to effect the locking operation. At the free ends of the interlock tongues 39 is an upwardly extending locking tab 39a which interlocks within the track connector 41 to affix the removable track portion 38 to track 37.

The track connectors 41 comprise side tongue supports 43 spaced from one another and on opposite sides of track 37. Placed between the side tongue supports 43 and lying at the bottom of the channel formed thereby is a bottom tongue support 44. At the free ends of the U shaped track portion 37 and in the area bounded by the side tongue supports 43, is a locking recess 45 within the track portion itself in which the locking tabs 39a are adapted to fit when the removable curved track portion 38 is affixed to the track portion 37. As can be seen from FIGURE 10, when it is desired to utilize the curved track portion 38, the free ends thereof are inserted above the bottom tongue supports 44 and then positioned so as to have the locking tabs 39a firmly interengaged with their locking recess 45. In this manner, the entire weight of the curved track portion 38 is resting between the side tongue supports 43 and upon the bottom tongue support 44. In addition, the track portion 38 is prevented from longitudinal movement due to the interengagement of the locking tabs and locking recess.

In order to utilize the present invention with the top track support member 15 engaged, a suitable roller unit 46 is provided having a flanged wheel 47 which rolls upon the top edge of the track 36. At the bottom of the roller unit 46 there depends a hook hanger 48 for suitably engaging bulk meat products. Since at times it may be desired that the bulk meat products do not roll past a desired point, and especially should the removable curved track portion 38 not be in operative position, there is provided at spaced intervals along the track 37 a plurality of hinged stops 49. These stops are suitably mounted to the track supports 35 and are adapted to be positioned across the track 37 so that the recess 51 within the stops engage the top portion of the track 37. This, therefore, prevents the roller unit 46 from advancing past a particular area upon the track. As desired, one or more of the stops may be utilized to effect the desired purpose.

Referring now to FIGURE 4, it is obvious that at times it may be necessary or desirable to utilize together more than one of the meat handling apparatus units 11. Should this occur, there has been provided a connecting system which will interconnect two of the units to form an elongated oval track, thus adding the capability of storing large amount of bulk meat products. In order to effect such a configuration there is provided straight track sections having at each end thereof interlock tongues 39 so as to interlock with the track connectors 41 of each U shaped track member 37. Of course the straight tracks 52 may be of any desired length within reason, the only requirement being that the resulting structure be stable enough to hold the weight which will be imposed.

Should it become desirable to utilize the meat handling apparatus 11 more in a storage capacity for flat products upon the removable trays 14, it is anticipated that a pair of the units be utilized in a manner which places one upon the other. Such a configuration is disclosed in FIGURE 3. In this concept the tubular feet 19 of the uppermost base member 12 would be affixed upon the upper topmost portion of the vertical standards 21 of the lower meat handling apparatus 11. In this manner there is provided a large number of removable trays 14 which could be utilized for storing bulk items in a non-hanging configuration. It is also anticipated that the meat handling apparatus 11 of the present invention may be easily transported from one place to another by means of a suitable device such as a fork lift truck. The base member 12 of the present invention is so designed that it will be completely compatible with commercially available fork lift trucks.

While I have particularly shown and described one particular embodiment of the invention, it is distinctly understood that the invention is not limited thereto, but that modifications may be made within the scope of the invention and such variations as are covered by the scope of the appended claims.

What is claimed is:

1. A meat handling apparatus comprising a base member having downwardly extending leg support members, a pair of vertically extending side rack members adapted for removable engagement with the leg support members of the base member, the side rack member comprising a pair of vertical standards, a plurality of horizontal braces interconnecting the vertical standards of each side rack member, the base member further having a planar shelf surface supported by the leg support members and means for storing bulk products comprising a top track support member removably mounted upon the uppermost portion of the vertical standard of the side rack members, track means integral with the top track support member, roller means mounted in rolling engagement with the track means, hanger means mounted upon the roller means for suspending bulk products from the track means.

2. A meat handling apparatus as defined in claim 1, wherein the top track support member comprises a rectangular frame having one open end, track support members supporting the track means within the confines of the top track support member, means depending from the corners of the rectangular frame of the top track support member adapted for engagement with the vertical standards of the side rack members so as to support the top track support member thereupon, the track means being of oval configuration.

3. A meat handling apparatus as defined in claim 2, wherein the oval shaped track means comprise first and second track sections, the first track section generally defining a U shaped configuration, the second track section being curved and being disengageable from the first track section, and means for interlocking the first and second track sections in a unitary structure.

4. A meat handling apparatus as defined in claim 3, wherein the means for interlocking the first and second track sections comprise at least one track connector attached to each free end of the U-shaped track member, an interlock tongue connected to each free end of the curved track section, the interlock tongue being adapted to engage the track connector, means integral with the track connector to lockingly engage the interlock tongue.

5. A meat handling apparatus comprising first and second support units, each unit having a base member with downwardly extending leg support members, a pair of vertically extending side rack members in each unit adapted for removable engagement with leg support members of the base member, the side rack members comprising a pair of vertical standards, a plurality of braces interconnecting the vertical standards of each side rack member, each base member further having a planar shelf surface, the first and second support units being separated by a predetermined distance, U-shaped track means in each unit respectively facing each other, and straight track means interconnecting the units which permit free movement of bulk products within the confines of the side rack members on said U-shaped track means and fron one unit to the other on said straight track means.

6. A meat handling apparatus as defined in claim 5, wherein the means to interconnect the units comprise in each unit a top track support member removably mounted on the uppermost portion of the vertical standard of the side rack members of each unit with said U-shaped track means being integral with the top track support member, roller means in rolling engagement with said U-shaped track means and said straight track means, hanger means mounted upon the roller means adapted for suspending bulk products from both of said track means.

7. A meat handling apparatus as defined in claim 6, wherein the top track support member comprises a rectangular frame having one open end, track support members supporting the track means within the confines of the top track support member and means depending from the corners of the rectangular frame of the top track support member adapted for engagement with the vertical standards of the side rack members so as to support the top track support member thereupon.

8. In a meat handling apparatus as defined in claim 7, means for interlocking each open ended track means with the interconnecting straight track means, the interlocking means comprising at least one track connector attached to each free end of the U-shaped track means of each unit, an interlock tongue connected to each free end of the straight track means, the interlock tongue being adapted to engage the track connector and means integral with the track connector to lockingly engage the interlock tongue.

References Cited

UNITED STATES PATENTS

| 576,858 | 2/1897 | Knope et al. | 182—178 X |
| 1,103,689 | 7/1914 | Russell | 182—178 X |
| 2,385,559 | 9/1945 | Wenthe | 211—177 |
| 2,848,294 | 8/1958 | Sandberg | 312—304 X |

FOREIGN PATENTS

| 586,729 | 12/1958 | Italy. |
| 636,497 | 3/1962 | Italy. |
| 86,077 | 8/1955 | Norway. |

ROY D. FRAZIER, *Primary Examiner.*

FRANK DOMOTOR, *Assistant Examiner.*